United States Patent
Zhou et al.

(10) Patent No.: US 11,452,081 B2
(45) Date of Patent: Sep. 20, 2022

(54) SPATIAL RELATIONSHIP DETERMINATION METHOD, TERMINAL AND BASE STATION

(71) Applicant: VIVO MOBILE COMMUNICATION CO., LTD., Guangdong (CN)

(72) Inventors: Jianping Zhou, Chang'an Dongguan (CN); Xiaodong Yang, Chang'an Dongguan (CN); Yumin Wu, Chang'an Dongguan (CN); Yanxia Zhang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 149 days.

(21) Appl. No.: 16/961,914

(22) PCT Filed: Jan. 10, 2019

(86) PCT No.: PCT/CN2019/071141
§ 371 (c)(1),
(2) Date: Jul. 13, 2020

(87) PCT Pub. No.: WO2019/137426
PCT Pub. Date: Jul. 18, 2019

(65) Prior Publication Data
US 2020/0389887 A1     Dec. 10, 2020

(30) Foreign Application Priority Data
Jan. 11, 2018     (CN) .......................... 201810027967.7

(51) Int. Cl.
*H04L 12/26* (2006.01)
*H04W 72/04* (2009.01)

(52) U.S. Cl.
CPC .............................. *H04W 72/0413* (2013.01)

(58) Field of Classification Search
CPC .......................... H04W 72/046; H04B 7/0695
See application file for complete search history.

(56) References Cited

U.S. PATENT DOCUMENTS

| | | | | |
|---|---|---|---|---|
| 2020/0280409 | A1* | 9/2020 | Grant | H04L 5/0023 |
| 2020/0288479 | A1* | 9/2020 | Xi | H04W 72/042 |

FOREIGN PATENT DOCUMENTS

| | | |
|---|---|---|
| CN | 106160976 A | 11/2016 |
| WO | 2017/107212 A1 | 6/2017 |

OTHER PUBLICATIONS

EP Search Report in Application No. 19738795.4 dated Dec. 14, 2020.
"Summary of QCL" 3GPP TSG RAN WG1#89, May 15, 2017.
(Continued)

*Primary Examiner* — Bo Hui A Zhu
(74) *Attorney, Agent, or Firm* — Maschoff Brennan

(57) ABSTRACT

The present disclosure provides a spatial relationship determination method, a terminal and a base station. The method in the present disclosure includes: receiving PUCCH resource configuration information sent by a base station, the PUCCH resource configuration information indicating a PUCCH resource; determining a target QCL required when using the PUCCH resource according to a predefined QCL or according to a downlink media access control layer control element (MAC CE) sent by the base station.

16 Claims, 4 Drawing Sheets

(56) References Cited

OTHER PUBLICATIONS

"Discussion on beam indication for UL transmission" 3GPP TSG RAN WG1 Meeting #90, Aug. 21, 2017.
"Summary of QCL" 3GPP TSG-RAN WG1 Meeting #90bis, Oct. 9, 2017.
"Chairman's notes for AI7.2 NR-MIMO" 3GPP TSG RAN WG1 Meeting 91, Nov. 27, 2017.
"Summary of Beam Mgmt" 3GPP TSDG RAN WG1 Meeting #91, Nov. 27, 2017.
Written Opinion and International Search Report in Application No. PCT/CN2019/071141 dated Mar. 28, 2019.

* cited by examiner

SPATIAL RELATIONSHIP DETERMINATION METHOD, TERMINAL AND BASE STATION

CROSS-REFERENCE TO RELATED APPLICATION

This application is the U.S. national phase of PCT Application No. PCT/CN2019/071141 filed on Jan. 10, 2019, which claims priority to Chinese Patent Application No. 201810027967.7 filed on Jan. 11, 2018, the disclosures of which are incorporated in their entirety by reference herein.

TECHNICAL FIELD

The present disclosure relates to the field of communication application technology, and in particular to a spatial relationship determination method, a terminal and a base station.

BACKGROUND

Beam management includes processes such as beam measurement, beam reporting, beam indication, and so on. Network side configures the setting information of the beam reporting (i.e., reporting setting) for UE through high-level signaling, which includes the content information of the beam reporting, the time-domain related messages of the beam reporting (which may be periodic, aperiodic, semi-persistent), and the frequency granularity information of the beam reporting, etc. The content information of the beam reporting may include: at least one optimal transmitting beam identification information selected by the UE, and physical layer measurement result of the beam selected by the UE (such as Layer 1-reference signal received power (L1-RSRP)), grouping information of the beam selected by the UE, etc.

For signals with the same channel characteristics in different channels, it can be assumed that these signals are from the same source. Spatial relationship (Quasi-collocation(QCL)) configuration may include a variety of different signal types (for example, Channel State Information-Reference Signal (CSI-RS) or Synchronous Signal Block (SS block)). The network side can configure corresponding QCL signals for different beams. The network side can change the beam with which the UE works by changing the QCL configuration of the UE.

When the UE receives a Physical Uplink Control Channel (PUCCH) resource, it faces problems as follows: does it immediately use the PUCCH resource? If yes, what spatial relationship does it correspond to at this time? If not, what will be used to indicate the spatial relationship of the PUCCH resource before using the PUCCH resource? These problems have not been solved.

SUMMARY

In a first aspect, the present disclosure provides a spatial relationship determination method applied to a terminal, which includes:

receiving physical uplink control channel (PUCCH) resource configuration information sent by a base station, the PUCCH resource configuration information indicating a PUCCH resource;

determining a target QCL required when using the PUCCH resource according to a predefined spatial relationship QCL or according to a downlink media access control layer control element (MAC CE) sent by the base station.

In a second aspect, an embodiment of the present disclosure further provides a spatial relationship determination method applied to a base station, including:

sending physical uplink control channel (PUCCH) resource configuration information to a terminal, the PUCCH resource configuration information indicating a PUCCH resource; sending a downlink media access control layer control element (MAC CE) to the terminal.

In a third aspect, an embodiment of the present disclosure further provides a terminal including:

a receiving module configured to receive physical uplink control channel (PUCCH) resource configuration information sent by a base station, the PUCCH resource configuration information indicating a PUCCH resource;

a determination module configured to determine a target QCL required when using the PUCCH resource according to a predefined spatial relationship QCL or according to a downlink media access control layer control element (MAC CE) sent by the base station.

In a fourth aspect, an embodiment of the present disclosure further provides a terminal including a storage, a processor, and a computer program stored on the storage and capable of running on the processor, the computer program implementing, when executed by the processor, the steps of the above spatial relationship determination method.

In a fifth aspect, an embodiment of the present disclosure further provides a computer readable storage medium having a computer program stored thereon, the computer program implementing, when executed by a processor, the steps of the above spatial relationship determination method.

In a sixth aspect, an embodiment of the present disclosure further provides a base station including:

a first sending module configured to send physical uplink control channel (PUCCH) resource configuration information to a terminal, the PUCCH resource configuration information indicating a PUCCH resource;

a second sending module configured to send a downlink media access control layer control element (MAC CE) to the terminal.

In a seventh aspect, an embodiment of the present disclosure further provides a base station including a storage, a processor, and a computer program stored on the storage and capable of running on the processor, the computer program implementing, when executed by the processor, the steps of the above spatial relationship determination method applied to the base station side.

In an eighth aspect, an embodiment of the present disclosure further provides a computer readable storage medium having a computer program stored thereon, the computer program implementing, when executed by a processor, the steps of the above spatial relationship determination method.

BRIEF DESCRIPTION OF THE DRAWINGS

In order to explain the technical solutions of the embodiments of the present disclosure more clearly, the following will briefly introduce the drawings required in the description of the embodiments of the present disclosure. Obviously, the drawings in the following description are only some embodiments of the present disclosure. For those of ordinary skill in the art, other drawings can also be obtained based on these drawings without paying any creative effort.

DETAILED DESCRIPTION

Hereinafter, the technical solutions in the embodiments of the present disclosure will be described clearly and thoroughly in conjunction with the drawings in the embodiments of the present disclosure. Obviously, the described embodiments are part of the embodiments of the present disclosure, but not all of the embodiments. Based on the embodiments in the present disclosure, all other embodiments obtained by a person of ordinary skill in the art without creative efforts should fall within the protection scope of the present disclosure.

Figure 1:
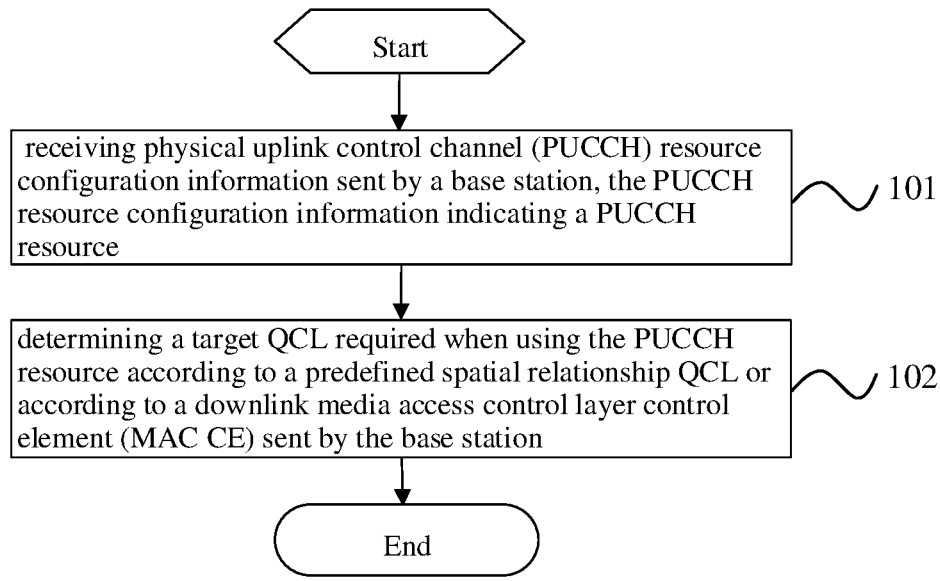
FIG. 1 is a first schematic flowchart of a spatial relationship determination method according to an embodiment of the present disclosure.

FIG. 1 is a first schematic flowchart of a spatial relationship determination method according to an embodiment of the present disclosure. As shown in FIG. 1, the spatial relationship determination method, which is applied to a terminal, includes:

Step 101: receiving physical uplink control channel (PUCCH) resource configuration information sent by a base station, the PUCCH resource configuration information indicating a PUCCH resource.

Step 102: determining a target QCL required when using the PUCCH resource according to a predefined spatial relationship QCL or according to a downlink media access control layer control element (MAC CE) sent by the base station.

Wherein, the number of the PUCCH resource is associated with a target byte in the MAC CE, each bit in the target byte corresponds to a QCL, and only one bit in the target byte has a preset value.

In the embodiment of the present disclosure, a number ID of each PUCCH resource is determined according to the number of the PUCCHs configured currently through the Radio Resource Control (RRC) message. For example, if the PUCCH resource is the first PUCCH resource configured by the base station, the number of the PUCCH resource is 1, and corresponds to the first byte in the MAC CE. If the PUCCH resource is the nth PUCCH resource configured by the base station, the number of the PUCCH resource is n, and corresponds to the nth byte in the MAC CE.

The above target QCL may be a QCL relationship corresponding to a target bit in the target byte of the MAC CE of the media access control layer control element (MAC CE), or may be a synchronization signal block (SSB) used by the terminal when initially accessing a cell or a PUSCH resource corresponding to the PUCCH resource. The predefined QCL is a QCL configured in advance by the base station or agreed by a protocol.

The method including receiving the physical uplink control channel (PUCCH) resource sent by the base station; and determining the target QCL required when using the PUCCH resource according to the predefined spatial relationship QCL or according to the downlink media access control layer control element (MAC CE) sent by the base station solves the problem of how to determine the QCL required when using the PUCCH resource if the terminal is newly configured a PUCCH resource. Moreover, the method of the present disclosure can flexibly change the QCL required when using the PUCCH resource, thus having a higher flexibility in the spatial relationship configuration of resources.

Further, in the above step 102, the step of determining the target QCL required when using the PUCCH resource according to the downlink media access control layer control element (MAC CE) sent by the base station includes:

determining a QCL relationship corresponding to a target bit in the target byte of the downlink MAC CE as the target QCL, after receiving the downlink MAC CE sent by the base station;

wherein, the target bit is the bit in the target byte which has the preset value. Specifically, the preset value may be 1.

Here, after receiving the downlink media access control layer control element (MAC CE), the terminal determines the QCL relationship corresponding to the target bit in the target byte of the downlink MAC CE as the target QCL, and starts to use this PUCCH resource according to the target QCL.

Specifically, if the target QCL is received at Nth subframe, the PUCCH resource is started to be used at (N+t)th subframe, where N is a positive integer, and t is a natural number; t may be configured by the physical layer, or may be agreed by a protocol; t may be in units of subframes, or in units of symbols or ms.

Figure 2:
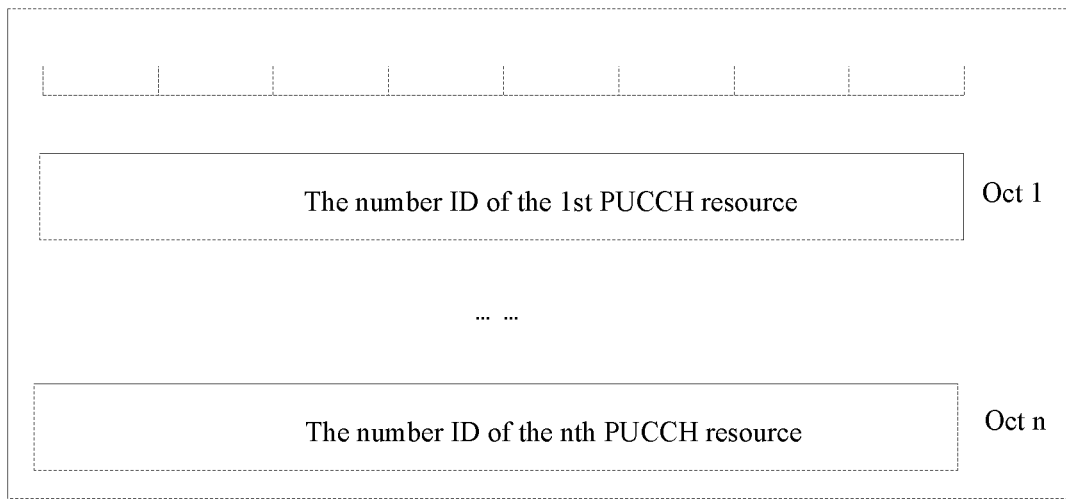
FIG. 2 is a schematic diagram of a first format of a downlink MAC CE according to an embodiment of the present disclosure.
Figure 3:
FIG. 3 is a schematic diagram of a second format of a downlink MAC CE according to an embodiment of the present disclosure.

In this implementation, the number ID of each PUCCH resource is determined according to the number of the PUCCHs configured according to the radio resource control (RRC) message. For example, the ID of the first PUCCH resource configured through the RRC message is 1, and the ID of the configured nth PUCCH resource is n. Each resource ID is associated with one byte in the MAC CE. As shown in FIG. 2, when the ID of a PUCCH resource is 1, the byte associated with it is byte 1 (Oct 1); when the ID of a PUCCH resource is n, the byte associated with it is byte n (Oct n). As shown in FIG. 3, each byte in the MAC CE includes 8 bits, and each bit corresponds to one QCL. For example, when Ri is set to 1, this means the ith QCL is adopted. In a PUCCH resource, at most one QCL relationship is selected. Thus, only one of the 8 bits is set to 1.

The spatial relationship corresponding to each bit may be configured using the RRC message, such as 8 spatial relationships QCL1 . . . QCL8. Then the resource ID of a certain PUCCH resource indicates which spatial relationship is adopted. For example, if the resource ID of the current PUCCH resource is 6, a bit set to 1 is selected from the sixth byte of the MAC CE, and the QCL corresponding to the bit is used as the target QCL.

Here, the target QCL is determined through the downlink MAC CE sent by the base station, thus saving signaling overhead.

Further, in the above step 102, the step of determining the target QCL required when using the PUCCH resource according to the predefined spatial relationship QCL includes:

determining a synchronization signal block or a physical uplink sharing channel (PUSCH) corresponding to the PUCCH resource as the target QCL at first, and when receiving the downlink MAC CE, changing the target QCL to a QCL corresponding to a target bit in the target byte of the downlink MAC CE;

wherein, the target bit is the bit in the target byte which has the preset value.

The PUSCH corresponding to the PUCCH resource refers to a PUSCH located in a same bandwidth part (BWP) or in a same carrier component (CC) as the PUCCH resource.

Here, after receiving the PUCCH resource configuration information sent by the base station, the terminal first determines the synchronization signal block or the PUSCH corresponding to the PUCCH resource indicated by the PUCCH resource configuration information as the target QCL, and then starts to use the PUCCH resource according to the synchronization signal block or the PUSCH; when receiving the downlink MAC CE, it changes the target QCL to the QCL corresponding to the target bit in the target byte of the downlink MAC CE.

The above synchronization signal block is a synchronization signal block at the initial access of the terminal. In this implementation, once the UE is newly configured with a PUCCH resource, it uses the synchronization signal block or PUSCH resource at the initial access as the target QCL to start using the PUCCH resource, and after receiving a DL MAC CE, changes the target QCL corresponding to the PUCCH resource.

In this implementation, the format of the downlink MAC CE is the same as the format of the MAC CE in the above implementation, and will not be repeated here.

Further, in the above step 102, the step of determining the target QCL required when using the PUCCH resource according to the predefined spatial relationship QCL includes:

determining the predefined QCL as the target QCL at first, and when receiving the downlink MAC CE, changing the target QCL to a QCL corresponding to a target bit in the target byte of the downlink MAC CE;

wherein, the target bit is the bit in the target byte which has the preset value;

the predefined QCL is a QCL configured in advance by the base station or agreed by a protocol.

Specifically, the above predefined QCL may be configured in advance by the base station, e.g., the RRC configures the first QCL among multiple QCLs of this PUCCH resource as the predefined QCL; alternatively, a QCL with the smallest or largest index among multiple QCLs is configured as the predefined QCL by the agreement of a protocol.

In this implementation, when receiving the PUCCH resource configuration information sent by the base station, the terminal determines the predefined QCL as the target QCL at first, and starts to use the above PUCCH resource according to the predefined QCL; when receiving the downlink MAC CE, it changes the target QCL to the QCL corresponding to the target bit in the target byte of the downlink MAC CE, thus solving the problem of how to determine the QCL required when using the PUCCH resource if the terminal is newly configured a PUCCH resource. Moreover, the method of the present disclosure can flexibly change the QCL required when using the PUCCH resource, thus having a higher flexibility in the spatial relationship configuration of resources.

The spatial relationship determination method according to the embodiment of the present disclosure includes: receiving the physical uplink control channel (PUCCH) resource configuration information sent by the base station, the PUCCH resource configuration information indicating a PUCCH resource; determining the target QCL required when using the PUCCH resource according to the predefined spatial relationship QCL or according to the downlink media access control layer control element (MAC CE) sent by the base station, thereby solving the problem of how to determine the QCL required when using the PUCCH resource if the terminal is newly configured a PUCCH resource; moreover, the method of the present disclosure can flexibly change the QCL required when using the PUCCH resource, thus having a higher flexibility in the spatial relationship configuration of resources.

Figure 4:
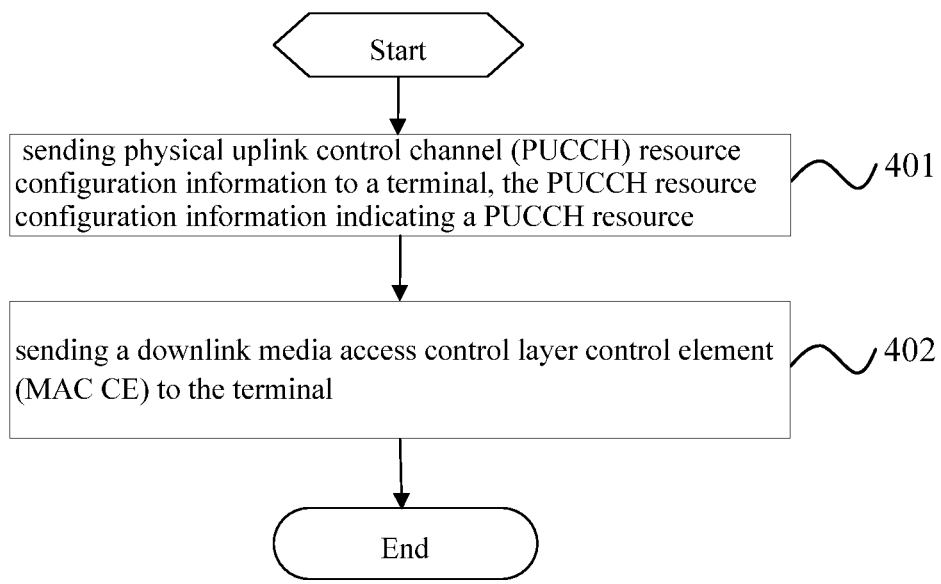
FIG. 4 is a second schematic flowchart of a spatial relationship determination method according to an embodiment of the present disclosure.

As shown in FIG. 4, an embodiment of the present disclosure further provides a spatial relationship determination method applied to a base station, which includes:

Step 401: sending physical uplink control channel (PUCCH) resource configuration information to a terminal, the PUCCH resource configuration information indicating a PUCCH resource.

Step 402: sending a downlink media access control layer control element (MAC CE) to the terminal.

Wherein, a number of the PUCCH resource is associated with a target byte in the MAC CE, each bit in the target byte corresponds to a QCL, and only one bit in the target byte has a preset value.

The base station sends the downlink MAC CE to the terminal so that the terminal determines the target QCL required when using the PUCCH resource according to the downlink MAC CE, thereby solving the problem of how to determine the QCL required when using the PUCCH resource if the terminal is newly configured a PUCCH resource; moreover, the method of the present disclosure can flexibly change the QCL required when using the PUCCH resource, thus having a higher flexibility in the spatial relationship configuration of resources.

Further, before the above step 402, the method further includes:

configuring for the terminal a target QCL required when using the PUCCH resource.

Specifically, the above predefined QCL may be configured in advance by the base station, e.g., the RRC configures the first QCL among multiple QCLs of this PUCCH resource as the predefined QCL; alternatively, a QCL with the smallest or largest index among multiple QCLs is configures as the predefined QCL.

The base station configures the target QCL required when using the PUCCH resource through the RRC in advance, so that the terminal uses the PUCCH resource according to the configured target QCL when receiving the PUCCH resource.

The format of the downlink MAC CE is the same as the format of the MAC CE in the above method embodiment applied to a terminal, and will not be repeated here.

In the above implementation, the target QCL is determined according to the downlink MAC CE, thus saving signaling overhead.

The spatial relationship determination method according to the embodiment of the present disclosure includes: sending the physical uplink control channel (PUCCH) resource configuration information to the terminal, the PUCCH resource configuration information indicating a PUCCH resource; sending the downlink media access control layer control element (MAC CE) to the terminal so that the terminal determines the target QCL required when using the PUCCH resource according to the downlink MAC CE, thereby solving the problem of how to determine the QCL required when using the PUCCH resource if the terminal is newly configured a PUCCH resource; moreover, the method of the present disclosure can flexibly change the QCL required when using the PUCCH resource, thus having a higher flexibility in the spatial relationship configuration of resources.

Figure 5:
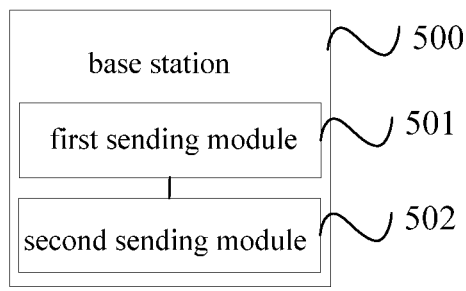
FIG. 5 is a schematic diagram of modules in a base station according to an embodiment of the present disclosure.

As shown in FIG. 5, an embodiment of the present disclosure further provides a base station 500 including:

a first sending module 501 configured to send physical uplink control channel (PUCCH) resource configuration information to a terminal, the PUCCH resource configuration information indicating a PUCCH resource;

a second sending module 502 configured to send a downlink media access control layer control element (MAC CE) to the terminal.

The base station in the embodiment of the present disclosure further includes:

a configuration module configured to configure for the terminal a target QCL required when using the PUCCH resource.

It should be noted that, this base station embodiment is a base station corresponding to the above spatial relationship determination method applied to a base station side, and therefore, all implementations of the above embodiment are applicable to this base station embodiment and the same technical effects can also be achieved.

An embodiment of the present disclosure further provides a base station including a storage, a processor, and a computer program stored on the storage and capable of running on the processor, the computer program implementing, when executed by the processor, the processes in the above spatial relationship determination method embodiment applied to a base station side and can achieve the same technical effects, which will not be described here again to avoid repetition.

An embodiment of the present disclosure further provides a computer readable storage medium having a computer program stored thereon, the computer program implementing, when executed by a processor, the processes in the above spatial relationship determination method embodiment applied to a base station side and can achieve the same technical effects, which will not be described here again to avoid repetition. Wherein, the computer readable storage medium may be, for example, a Read-Only Memory (ROM), a Random Access Memory (RAM), a magnetic disk or an optical disk, etc.

Figure 6:
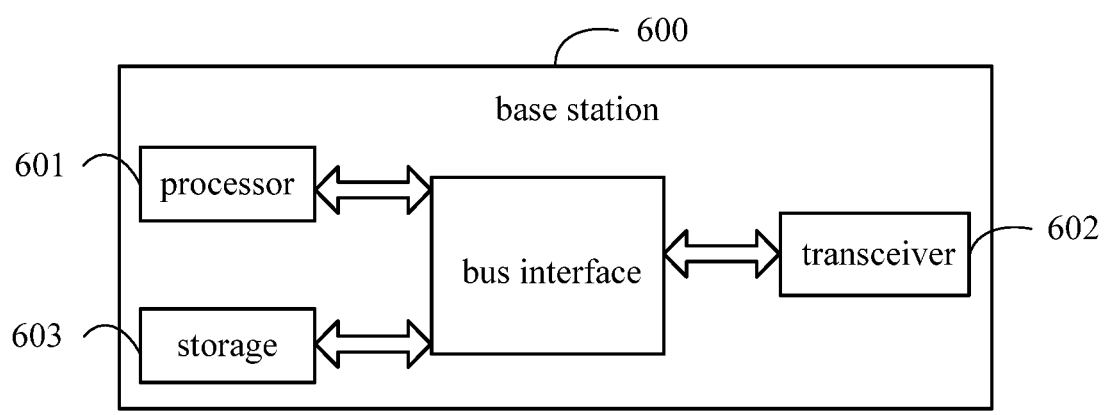
FIG. 6 is a structural block diagram of a base station according to an embodiment of the present disclosure.

FIG. 6 is a structural diagram of a base station according to an embodiment of the present disclosure which can implement the details of the above spatial relationship determination method and achieve the same effects. As shown in FIG. 6, the base station 600 includes a processor 601, a transceiver 602, a storage 603 and a bus interface, in which:

the processor 601 is configured to read the programs in the storage 603 to perform the following processes:

sending physical uplink control channel (PUCCH) resource configuration information to a terminal, the PUCCH resource configuration information indicating a PUCCH resource;

sending a downlink media access control layer control element (MAC CE) to the terminal.

Wherein, the number of the PUCCH resource is associated with a target byte in the MAC CE, each bit in the target byte corresponds to a QCL, and only one bit in the target byte has a preset value.

In FIG. 6, the bus architecture may include any number of interconnected buses and bridges, which are linked together specifically by various circuits such as one or more processors represented by the processor 1001 and the storage represented by the storage 1003. The bus architecture can also link various other circuits such as peripheral devices, voltage regulators, and power management circuits, etc., which are well known in the art, and therefore, they will not be further described herein. The bus interface provides interfaces. The transceiver 602 may be a plurality of elements, including a transmitter and a receiver, and provides units for communicating with various other devices on a transmission medium.

The processor 601 is responsible for managing the bus architecture and general processing, and the storage 603 may store data used by the processor 601 when performing operations.

Optionally, the processor 601 is configured to read the programs in the storage 603 to further perform:

configuring for the terminal a target QCL required when using the PUCCH resource.

The base station according to the embodiment of the present disclosure sends a physical uplink control channel (PUCCH) resource configuration information to the terminal, the PUCCH resource configuration information indicating a PUCCH resource; sends a downlink media access control layer control element (MAC CE) to the terminal so that the terminal determines the target QCL required when using the PUCCH resource according to the downlink MAC CE, thereby solving the problem of how to determine the QCL required when using the PUCCH resource if the terminal is newly configured a PUCCH resource; moreover, the base station of the present disclosure can flexibly change the QCL required when using the PUCCH resource, thus having a higher flexibility in the spatial relationship configuration of resources.

Figure 7:
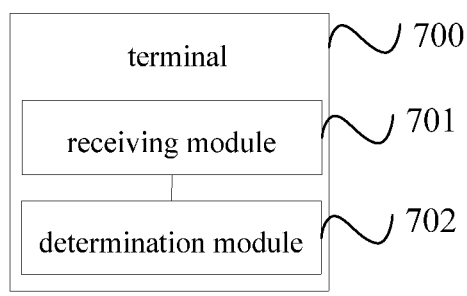
FIG. 7 is a schematic diagram of modules in a terminal according to an embodiment of the present disclosure.

As shown in FIG. 7, an embodiment of the present disclosure further provides a terminal 700 including:

a receiving module 701 configured to receive physical uplink control channel (PUCCH) resource configuration information sent by a base station, the PUCCH resource configuration information indicating a PUCCH resource;

a determination module 702 configured to determine a target QCL required when using the PUCCH resource according to a predefined spatial relationship QCL or according to a downlink media access control layer control element (MAC CE) sent by the base station;

wherein the number of the PUCCH resource is associated with a target byte in the MAC CE, each bit in the target byte corresponds to a QCL, and only one bit in the target byte has a preset value.

In the terminal according to the embodiment of the present disclosure, the determination module is configured to determine a QCL relationship corresponding to a target bit in the target byte of the downlink MAC CE as the target QCL, after the downlink MAC CE sent by the base station is received;

wherein, the target bit is the bit in the target byte which has the preset value.

The terminal according to the embodiment of the present disclosure further includes:

a processing module configured to start to use the PUCCH resource at the (N+t)th subframe if the target QCL is received at the Nth subframe, wherein N is a positive integer, and t is a natural number.

In the terminal according to the embodiment of the present disclosure, the determination module is configured to determine a synchronization signal block or a physical uplink sharing channel (PUSCH) corresponding to the PUCCH resource as the target QCL at first, and, when the downlink MAC CE is received, change the target QCL to a QCL corresponding to a target bit in the target byte of the downlink MAC CE;

wherein, the target bit is the bit in the target byte which has the preset value.

The PUSCH corresponding to the PUCCH resource refers to a PUSCH located in a same bandwidth part (BWP) or in a same carrier component (CC) as the PUCCH resource.

In the terminal according to the embodiment of the present disclosure, the determination module is configured to determine the predefined QCL as the target QCL at first, and when the downlink MAC CE is received, change the target QCL to a QCL corresponding to a target bit in the target byte of the downlink MAC CE;

wherein, the target bit is the bit in the target byte which has the preset value;

the predefined QCL is a QCL configured in advance by the base station or agreed by a protocol.

It should be noted that, this terminal embodiment is a terminal corresponding to the above spatial relationship determination method applied to a terminal side, and therefore, all implementations of the above embodiment are applicable to this terminal embodiment and the same technical effects can also be achieved.

An embodiment of the present disclosure further provides a terminal including a storage, a processor, and a computer program stored on the storage and capable of running on the processor, the computer program implementing, when executed by the processor, the processes in the above spatial relationship determination method embodiment applied to a terminal side and can achieve the same technical effects, which will not be described here again to avoid repetition.

An embodiment of the present disclosure further provides a computer readable storage medium having a computer program stored thereon, the computer program implementing, when executed by a processor, the processes in the above spatial relationship determination method embodiment applied to a terminal side and can achieve the same technical effects, which will not be described here again to avoid repetition. Wherein, the computer readable storage medium may be, for example, a Read-Only Memory (ROM), a Random Access Memory (RAM), a magnetic disk or an optical disk, etc.

Figure 8:
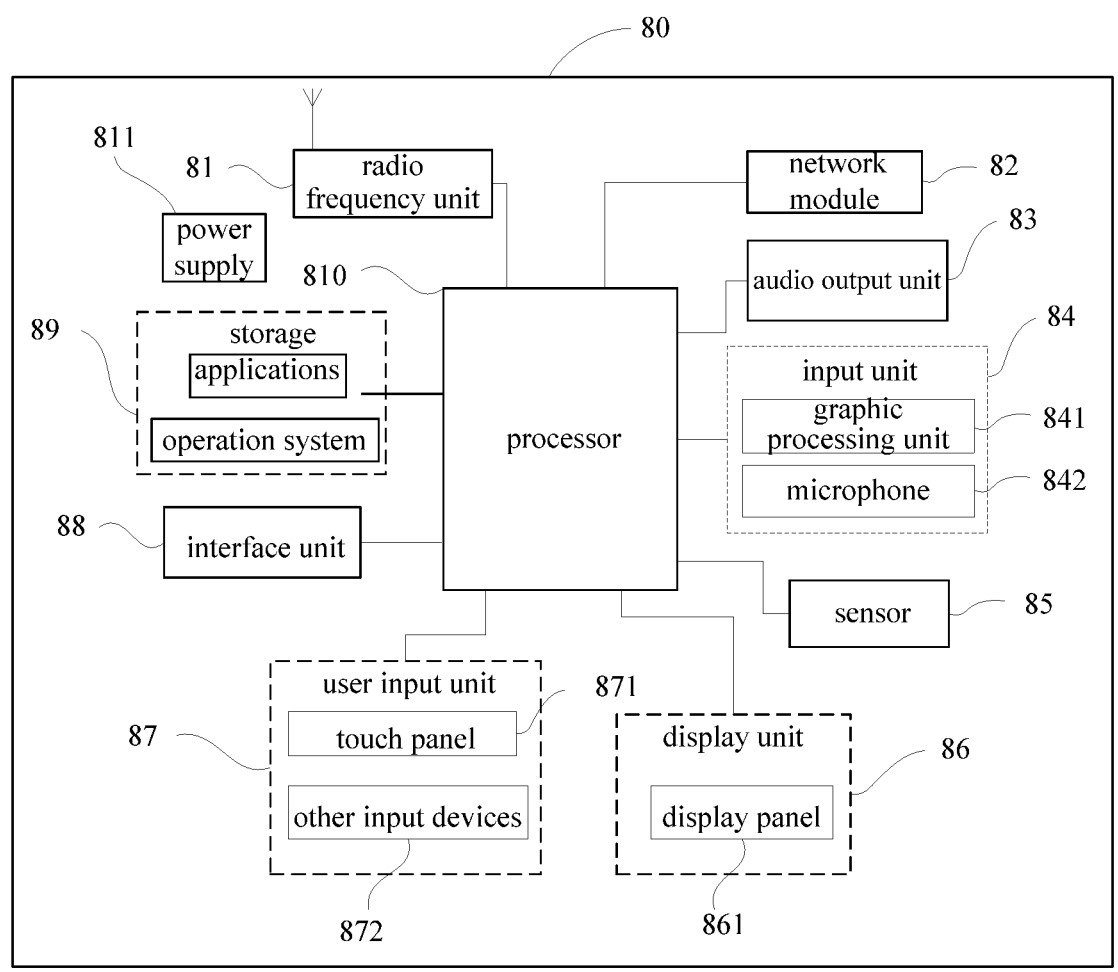
FIG. 8 is a structural block diagram of a terminal according to an embodiment of the present disclosure.

As shown in FIG. 8, it shows a structural block diagram of a terminal according to an embodiment of the present disclosure. The entity to which the spatial relationship determination method of the present disclosure is applied will be specifically described below with reference to the figure.

The terminal 80 as shown in FIG. 8 includes but is not limited to: a radio frequency unit 81, a network module 82, an audio output unit 83, an input unit 84, a sensor 85, a display unit 86, a user input unit 87, an interface unit 88, a storage 89, a processor 810, a power supply 811 and other components. Those skilled in the art may understand that the terminal structure shown in FIG. 8 does not constitute a limitation on the terminal, and the terminal may include more or fewer components than those illustrated, or combine some components, or have different component arrangement. In the embodiment of the present disclosure, the terminal includes but is not limited to a mobile phone, a tablet, a notebook, a palmtop computer, a vehicle-mounted terminal, a wearable device, a pedometer, and the like.

Among them, the radio frequency unit 81 is configured to receive and send data under the control of the processor 810;

the processor 810 is configured to receive physical uplink control channel (PUCCH) resource configuration information sent by a base station, the PUCCH resource configuration information indicating a PUCCH resource;

determine a target QCL required when using the PUCCH resource according to a predefined spatial relationship QCL or according to a downlink media access control layer control element (MAC CE) sent by the base station.

Wherein, the number of the PUCCH resource is associated with a target byte in the MAC CE, each bit in the target byte corresponds to a QCL, and only one bit in the target byte has a preset value.

The processor 810 is further configured to determine a QCL relationship corresponding to a target bit in the target byte of the downlink MAC CE as the target QCL, after the downlink MAC CE sent by the base station is received;

wherein, the target bit is the bit in the target byte which has the preset value.

The processor 810 is further configured to start to use the PUCCH resource at (N+t)th subframe if the target QCL is received at Nth subframe, wherein N is a positive integer, and t is a natural number.

The processor 810 is further configured to determine a synchronization signal block or a physical uplink sharing channel (PUSCH) corresponding to the PUCCH resource as the target QCL at first, and change the target QCL to a QCL corresponding to a target bit in the target byte of the downlink MAC CE when the downlink MAC CE is received;

wherein, the target bit is the bit in the target byte which has the preset value;

the PUSCH corresponding to the PUCCH resource refers to a PUSCH located in a same bandwidth part (BWP) or in a same carrier component (CC) as the PUCCH resource.

The processor 810 is further configured to determine the predefined QCL as the target QCL at first, and change the target QCL to a QCL corresponding to a target bit in the target byte of the downlink MAC CE when the downlink MAC CE is received;

wherein, the target bit is the bit in the target byte which has the preset value;

the predefined QCL is a QCL configured in advance by the base station or agreed by a protocol.

The terminal according to the embodiment of the present disclosure receives the physical uplink control channel (PUCCH) resource configuration information sent by the base station, the PUCCH resource configuration information indicating a PUCCH resource; determines the target QCL required when using the PUCCH resource according to the predefined spatial relationship QCL or according to the downlink media access control layer control element (MAC CE) sent by the base station, thereby solving the problem of how to determine the QCL required when using the PUCCH resource if the terminal is newly configured a PUCCH resource; moreover, the terminal of the present disclosure can flexibly change the QCL required when using the PUCCH resource, thus having a higher flexibility in the spatial relationship configuration of resources.

It should be understood that, in the embodiment of the present disclosure, the radio frequency unit 81 may be used to receive and send signals during sending and receiving information or during a call. Specifically, after receiving the downlink data from the base station, the processor 810 processes the data; also, the uplink data is sent to the base station. Generally, the radio frequency unit 81 includes, but is not limited to, an antenna, at least one amplifier, a transceiver, a coupler, a low noise amplifier, a duplexer, and the like. In addition, the radio frequency unit 81 can also communicate with the network and other devices through a wireless communication system.

The terminal provides users with wireless access to the broadband Internet through the network module 82, such as helping users to send and receive e-mail, browse web pages, access streaming media, and the like.

The audio output unit 83 may convert the audio data received by the radio frequency unit 81 or the network module 82 or stored in the storage 89 into an audio signal and output as sound. Moreover, the audio output unit 83 may also provide audio output related to specific functions performed by the terminal 80 (e.g., call signal reception sound, message reception sound, etc.). The audio output unit 83 includes a speaker, a buzzer, a receiver, and the like.

The input unit 84 is used to receive audio or video signals. The input unit 84 may include a Graphics processing Unit (GPU) 841 and a microphone 842. The graphics processing unit 841 processes image data of still pictures or video obtained by an image capturing device (such as a camera) in the video capturing mode or the image capturing mode. The processed image frame may be displayed on the display unit 86. The image frame processed by the graphics processing unit 841 may be stored in the storage 89 (or other storage medium) or sent via the radio frequency unit 81 or the network module 82. The microphone 842 can receive sound, and can process such sound into audio data. The processed audio data can be converted into a format that can be sent to the mobile communication base station via the radio frequency unit 81 in the telephone call mode, and can be output.

The terminal 80 also includes at least one sensor 85, such as a light sensor, a motion sensor, and other sensors. Specifically, the light sensor includes an ambient light sensor and a proximity sensor, wherein the ambient light sensor can adjust the brightness of the display panel 861 according to the brightness of the ambient light, and the proximity sensor can close the display panel 861 and/or the backlight when the terminal 80 moves to the ear. As a type of motion sensor, the accelerometer sensor can detect the magnitudes of accelerations in various directions (generally three axes), and can detect the magnitude and direction of gravity when not moving, and can be used to recognize the posture of the terminal (such as horizontal and vertical screen switching, related games, magnetometer attitude calibration), to perform vibration recognition related functions (such as pedometer, tapping), etc.; the sensor 85 may also include a fingerprint sensor, a pressure sensor, an iris sensor, a molecular sensor, a gyroscope, a barometer, a hygrometer, a thermometer, an infrared sensor, etc., which will not be repeated here.

The display unit 86 is used to display information input by the user or information provided to the user. The display unit 86 may include a display panel 861, and the display panel 861 may be configured in the form of a Liquid Crystal Display (LCD), an Organic Light-Emitting Diode (OLED), or the like.

The user input unit 87 may be used to receive input numeric or character information, and generate key signal input related to user settings and function control of the terminal. Specifically, the user input unit 87 includes a touch panel 871 and other input devices 872. The touch panel 871, also known as a touch screen, can collect user's touch operation on or near it (for example, the user's operation on or near the touch panel 871 using any suitable object or accessory, such as a finger or a stylus). The touch panel 871 may include a touch detection device and a touch controller. Among them, the touch detection device detects the user's touch orientation, and detects the signal generated by the touch operation, and transmits the signal to the touch controller; the touch controller receives touch information from the touch detection device and converts it into contact coordinates, then sends the same to the processor 810, and receives and executes the command sent by the processor 810. In addition, the touch panel 871 can be implemented in various types such as resistive, capacitive, infrared, and surface acoustic wave types. In addition to the touch panel 871, the user input unit 87 may also include other input devices 872. Specifically, other input devices 872 may include, but are not limited to, a physical keyboard, function keys (such as volume control buttons, switch buttons, etc.), a trackball, a mouse, and a joystick, which will not be repeated here.

Further, the touch panel 871 may be overlaid on the display panel 861. When the touch panel 871 detects a touch operation on or near it, it transmits the touch operation to the processor 810 to determine the type of touch event, and then the processor 810 provides a corresponding visual output on the display panel 861 according to the type of touch event. Although in FIG. 8, the touch panel 871 and the display panel 861 are implemented as two independent components to realize the input and output functions of the terminal, in some embodiments, the touch panel 871 and the display panel 861 may be integrated to implement the input and output functions of the terminal, which is not limited here.

The interface unit 88 is an interface for connecting an external device to the terminal 80. For example, the external device may include a wired or wireless headset port, an external power (or battery charger) port, a wired or wireless data port, a memory card port, a port for connecting a device having an identification module, an audio input/output (I/O) port, a video I/O port, a headphone port, etc. The interface unit 88 may be used to receive input from external devices (e.g., data information, power, etc.) and transmit the received input to one or more elements within the terminal 80 or may be used to transfer data between the terminal 80 and the external devices.

The storage 89 may be used to store software programs and various data. The storage 89 may mainly include a program storage area and a data storage area, wherein the program storage area may store an operating system, applications required by at least one function (such as a sound playback function, an image playback function, etc.); the data storage area may store data created according to the use of a mobile phone (such as audio data, phone books, etc.), etc. In addition, the storage 89 may include a high-speed random access memory, and may also include a non-volatile storage, such as at least one magnetic disk storage device, a flash memory device, or other volatile solid-state storage devices.

The processor 810 is the control center of the terminal, connects various parts of the entire terminal by using various interfaces and lines, performs various functions and processing data of the terminal by running or executing software programs and/or modules stored in the storage 89 and calling data stored in the storage 89, so as to monitor the terminal as a whole. The processor 810 may include one or more processing units; preferably, the processor 810 may integrate an application processor and a modem processor, where the application processor mainly processes an operating system, a user interface, and applications, etc. The modem processor mainly processes wireless communication. It can be understood that the foregoing modem processor may not be integrated into the processor 810.

The terminal 80 may further include a power supply 811 (such as a battery) that supplies power to various components. Preferably, the power supply 811 may be logically connected to the processor 810 through a power management system, so as to implement charging, discharging, and power consumption management through the power management system.

In addition, the terminal 80 includes some unillustrated functional modules, which will not be repeated here.

The embodiments in this specification are described in a progressive manner. Each embodiment focuses on the differences from other embodiments, and the same or similar parts between the embodiments may refer to each other.

Those skilled in the art should understand that the embodiments of the present disclosure may be provided as a method, a system, or a computer program product. Therefore, the embodiments of the present disclosure may take the form of an entirely hardware embodiment, an entirely software embodiment, or an embodiment combining software and hardware aspects. Moreover, the embodiments of the present disclosure may take the form of a computer program product implemented on one or more computer-usable storage media (including but not limited to disk storage, CD-ROM, optical storage, etc.) containing computer-usable program codes therein.

The embodiments of the present disclosure are described with reference to flowcharts and/or block diagrams of methods, terminal equipments (systems), and computer program products according to the embodiments of the present disclosure. It will be appreciated that each process and/or block in the flowcharts and/or block diagrams, and combinations of processes and blocks in the flowcharts and block diagrams may be implemented by computer program instructions. These computer program instructions may be provided to a processor of a general purpose computer, special purpose computer, embedded processor, or other programmable data processing device to produce a machine, such that the instructions executed by the processor of the computer or other programmable data processing device generate means for implementing the functions specified in one or more of the processes in the flowcharts and/or one or more of the blocks in the block diagrams.

These computer program instructions may also be stored in a computer readable storage capable of guiding a computer or other programmable data processing device to work in a specific manner, such that the instructions stored in the computer-readable storage produce a manufactured article including the instruction means which implements the functions specified in one or more of the processes in the flowcharts and/or one or more of the blocks in the block diagrams.

These computer program instructions may also be loaded on a computer or other programmable data processing devices, so that a series of operation steps can be performed on the computer or other programmable devices to produce a computer-implemented process, so that the instructions executed on the computer or other programmable device provide the steps for implementing the functions specified in one or more of the processes in the flowcharts and/or one or more of the blocks in the block diagrams.

Although the preferred embodiments of the embodiments of the present disclosure have been described, those skilled in the art can make additional changes and modifications to these embodiments once they learn the basic inventive concept. Therefore, the appended claims are intended to be construed as including the preferred embodiments and all changes and modifications falling within the scope of the embodiments of the present disclosure.

It should also be noted that, herein the relational terms such as first and second are used only to distinguish one entity or operation from another entity or operation, and do not necessarily require or imply there is any such actual relationship or order between these entities or operations. Moreover, the terms "comprising", "including" or any other variant thereof are intended to cover non-exclusive inclusion, so that a process, method, article, or terminal equipment that includes a series of elements includes not only those elements, but also those that are not explicitly listed, or further includes elements inherent to such process, method, article or terminal equipment. Without more restrictions, the element defined by the sentence "comprising a . . . " does not exclude that there are other identical elements in the process, method, article, or terminal equipment that includes the element.

The above describes the preferred embodiments of the present disclosure. It should be noted that for those of ordinary skill in the art, a number of improvements and modifications can be made without departing from the principle of the present disclosure, which are also within the protective scope of the present disclosure.

What is claimed is:

1. A spatial relationship determination method applied to a terminal, comprising:
   receiving physical uplink control channel (PUCCH) resource configuration information sent by a base station, the PUCCH resource configuration information indicating a PUCCH resource; and
   determining a target Quasi-Collocation (QCL) required when using the PUCCH resource according to a predefined spatial relationship QCL or according to a downlink media access control layer control element (MAC CE) sent by the base station;
   wherein an index of the PUCCH resource is associated with a target byte in the MAC CE, each bit in the target byte corresponds to a QCL, and only one bit in the target byte has a value different from values of other bits in in the target byte.

2. The method according to claim 1, wherein the step of determining the target QCL required when using the PUCCH resource according to the downlink media access control layer control element (MAC CE) sent by the base station comprises:
   determining a QCL relationship corresponding to a target bit in the target byte of the downlink MAC CE as the target QCL, after receiving the downlink MAC CE sent by the base station;
   wherein, the target bit is the bit in the target byte which has the preset value.

3. The method according to claim 2, further comprising:
   starting to use the PUCCH resource at (N+t)th subframe if the target QCL is received at Nth subframe, wherein N is a positive integer, and t is a natural number.

4. The method according to claim 1, wherein the step of determining the target QCL required when using the PUCCH resource according to the predefined spatial relationship QCL comprises:
   determining a synchronization signal block or a physical uplink sharing channel (PUSCH) corresponding to the PUCCH resource as the target QCL at first, and when receiving the downlink MAC CE, changing the target QCL to a QCL corresponding to a target bit in the target byte of the downlink MAC CE;
   wherein, the target bit is the bit in the target byte which has the preset value.

5. The method according to claim 1, wherein the step of determining the target QCL required when using the PUCCH resource according to the predefined spatial relationship QCL comprises:
determining the predefined QCL as the target QCL at first, and when receiving the downlink MAC CE, changing the target QCL to a QCL corresponding to a target bit in the target byte of the downlink MAC CE;
wherein, the target bit is the bit in the target byte which has the preset value; and
the predefined spatial relationship QCL is a QCL configured in advance by the base station or agreed by a protocol.

6. A spatial relationship determination method applied to a base station, comprising:
sending physical uplink control channel (PUCCH) resource configuration information to a terminal, the PUCCH resource configuration information indicating a PUCCH resource; sending a downlink media access control layer control element (MAC CE) to the terminal;
wherein an index of the PUCCH resource is associated with a target byte in the MAC CE, each bit in the target byte corresponds to a QCL, and only one bit in the target byte has a value different from values of other bits in in the target byte.

7. The method according to claim 6, before the step of sending the downlink media access control layer control element (MAC CE) to the terminal, further comprising:
configuring for the terminal a target QCL required when using the PUCCH resource.

8. A terminal comprising a storage, a processor, and a computer program stored on the storage and capable of running on the processor, the computer program implementing a spatial relationship determination method when executed by the processor, the spatial relationship determination method comprises:
receiving physical uplink control channel (PUCCH) resource configuration information sent by a base station, the PUCCH resource configuration information indicating a PUCCH resource; and
determining a target Quasi-Collocation (QCL required when using the PUCCH resource according to a predefined spatial relationship QCL or according to a downlink media access control layer control element (MAC CE) sent by the base station;
wherein an index of the PUCCH resource is associated with a target byte in the MAC CE, each bit in the target byte corresponds to a QCL, and only one bit in the target byte has a value different from values of other bits in in the target byte.

9. A base station comprising a storage, a processor, and a computer program stored on the storage and capable of running on the processor, the computer program implementing, when executed by the processor, the steps of the spatial relationship determination method according to claim 6.

10. A non-transitory computer readable storage medium having a computer program stored thereon, the computer program implementing, when executed by a processor, the steps of the spatial relationship determination method according to claim 1.

11. The terminal according to claim 8, wherein in the spatial relationship determination method implemented by the computer program when executed by the processor, the step of determining the target QCL required when using the PUCCH resource according to the downlink media access control layer control element (MAC CE) sent by the base station comprises:
determining a QCL relationship corresponding to a target bit in the target byte of the downlink MAC CE as the target QCL, after receiving the downlink MAC CE sent by the base station; and
wherein, the target bit is the bit in the target byte which has the preset value.

12. The terminal according to claim 11, wherein the spatial relationship determination method implemented by the computer program when executed by the processor, further comprises:
starting to use the PUCCH resource at (N+t)th subframe if the target QCL is received at Nth subframe, wherein N is a positive integer, and t is a natural number.

13. The terminal according to claim 8, wherein in the spatial relationship determination method implemented by the computer program when executed by the processor, the step of determining the target QCL required when using the PUCCH resource according to the predefined spatial relationship QCL comprises:
determining a synchronization signal block or a physical uplink sharing channel (PUSCH) corresponding to the PUCCH resource as the target QCL at first, and when receiving the downlink MAC CE, changing the target QCL to a QCL corresponding to a target bit in the target byte of the downlink MAC CE; and
wherein, the target bit is the bit in the target byte which has the preset value.

14. The terminal according to claim 8, wherein in the spatial relationship determination method implemented by the computer program when executed by the processor, the step of determining the target QCL required when using the PUCCH resource according to the predefined spatial relationship QCL comprises:
determining the predefined QCL as the target QCL at first, and when receiving the downlink MAC CE, changing the target QCL to a QCL corresponding to a target bit in the target byte of the downlink MAC CE;
wherein, the target bit is the bit in the target byte which has the preset value; and
the predefined spatial relationship QCL is a QCL configured in advance by the base station or agreed by a protocol.

15. The base station according to claim 9, wherein the spatial relationship determination method implemented by the computer program when executed by the processor, further comprises the following step prior to sending the downlink media access control layer control element (MAC CE) to the terminal:
configuring for the terminal a target QCL required when using the PUCCH resource.

16. A non-transitory computer readable storage medium having a computer program stored thereon, the computer program implementing, when executed by a processor, the steps of the spatial relationship determination method according to claim 6.

* * * * *